(12) United States Patent
Szabo et al.

(10) Patent No.: US 6,963,851 B1
(45) Date of Patent: Nov. 8, 2005

(54) METHOD AND APPARATUS TO ENABLE CONSUMER REPLENISHMENT SHOPPING BY USEFUL LIFE

(75) Inventors: Robert M. Szabo, Boca Raton, FL (US); Keith N. Fortenberry, Boca Raton, FL (US); James J. Toohey, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,178

(22) Filed: May 8, 2000

(51) Int. Cl.$^7$ ............................................. G06F 17/60
(52) U.S. Cl. ........................... 705/26; 705/10; 705/14; 700/16; 700/18; 186/56
(58) Field of Search ......................................... 705/26

(56) References Cited

U.S. PATENT DOCUMENTS

| | | | | |
|---|---|---|---|---|
| 5,047,614 A | * | 9/1991 | Bianco | 235/382 |
| 5,664,110 A | * | 9/1997 | Green et al. | 705/26 |
| 5,711,160 A | * | 1/1998 | Namisniak et al. | 116/308 |
| 5,713,485 A | * | 2/1998 | Liff et al. | 221/129 |
| 5,848,399 A | | 12/1998 | Burke | |
| 6,055,513 A | * | 4/2000 | Katz et al. | 705/26 |
| 6,131,399 A | * | 10/2000 | Hall | 221/150 R |
| 6,131,812 A | * | 10/2000 | Schneider | 235/375 |
| 6,204,763 B1 | * | 3/2001 | Sone | 221/2 |
| 6,236,974 B1 | * | 5/2001 | Kolawa et al. | 705/7 |
| 6,249,773 B1 | * | 6/2001 | Allard et al. | 705/26 |
| 6,249,774 B1 | * | 6/2001 | Roden et al. | 700/106 |
| 6,327,576 B1 | * | 12/2001 | Ogasawara | 705/22 |

FOREIGN PATENT DOCUMENTS

| | | | |
|---|---|---|---|
| EP | 0 779 587 A2 | * 6/1997 | G06F 17/60 |

OTHER PUBLICATIONS

Lindquist, C. "The Totally Digital House: It's your refrigerator on line two. That old carton of milk expires tomorrow—would you like to order more?," PC/Computing (Jan. 2000).*

(Continued)

*Primary Examiner*—Jeffrey A. Smith
(74) *Attorney, Agent, or Firm*—Richard A. Tomlin; Jon A. Gibbons; Fleit, Kain, Gibbons, Gutman, Bongini & Bianco P.L.

(57) ABSTRACT

A method for producing a shopping list consisting of one or more items, wherein at least one item in the shopping list is a consumable item. The method on an e-commerce site comprising the storing data representing an inventory of items for sale at the e-commerce site. The purchase history of the items purchased by the consumers at the e-commerce site is stored along with the shopping list. A predetermined useful life of at least one item purchased in the purchase history by scanning a product code during the previous delivery of consumable items. The product code includes a date embedded therein. A useful life is predicted based on the rate of consumption by the plurality of consumers is stored. When a request is received from a consumer for a shopping lists to build an active shopping list the purchase history for the consumer to determine if a consumable item previously purchased from the purchase history has exceeded the predetermined useful life is reviewed. The consumer is able to authorize the addition of the consumable item previously purchased.

24 Claims, 12 Drawing Sheets

OTHER PUBLICATIONS

Guyette, J. "Produce producers picking SmartFruit's high-tech appeal," Automatic I.D. News, vol. 14, No. 10 (Sep. 1998).*

"Follow direction when taking home medical tests," Times Union (Jan. 27, 1998).*

<http://carcarecity.com/howwork.php3> downloaded Feb. 7, 2003, (Copyright 1999).*

Trunk, C. "The nuts and bolts of CMMS," Material Handling Engineering, vol. 52, No. 10 (Sep. 1997) p. 47.*

* cited by examiner

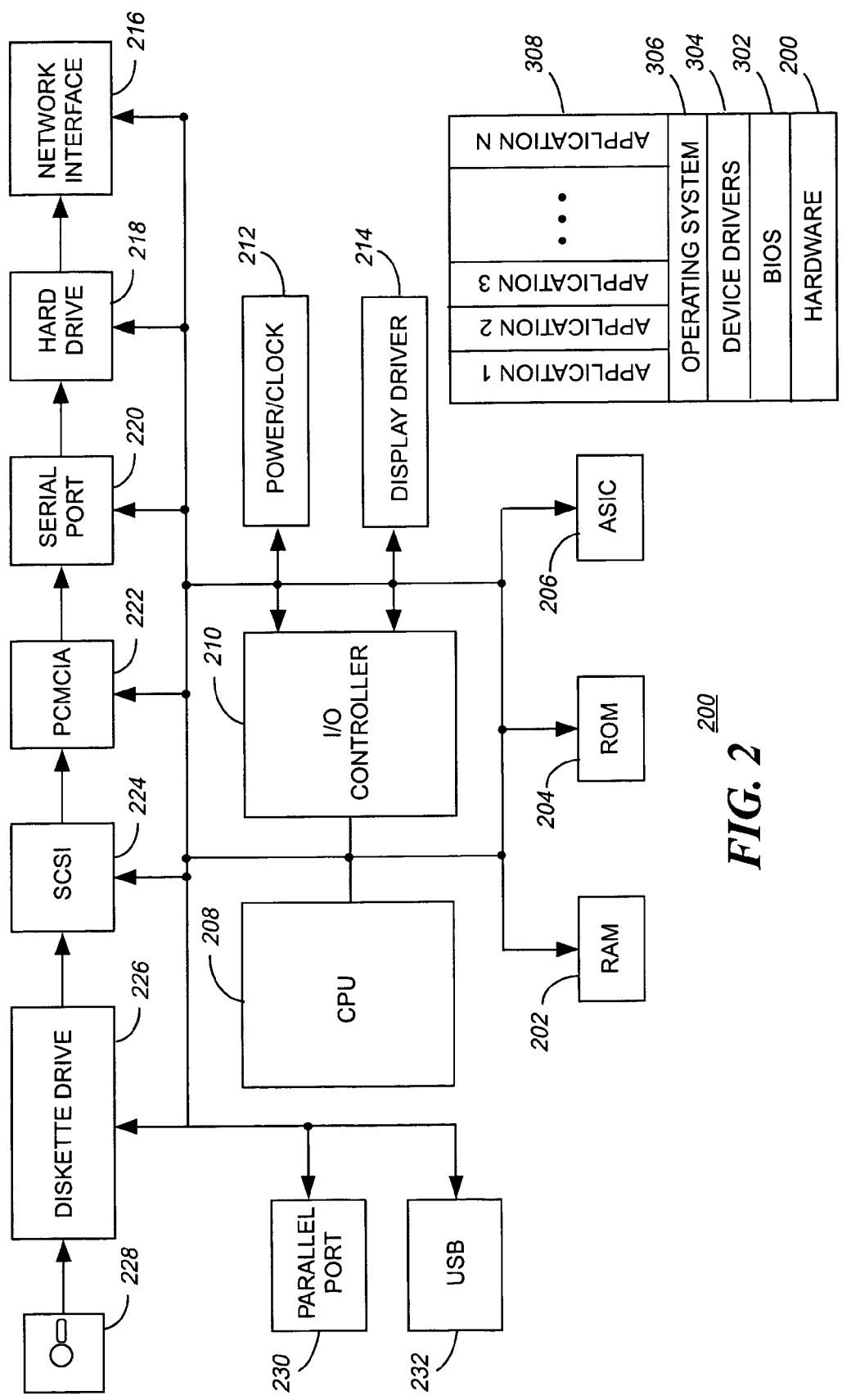

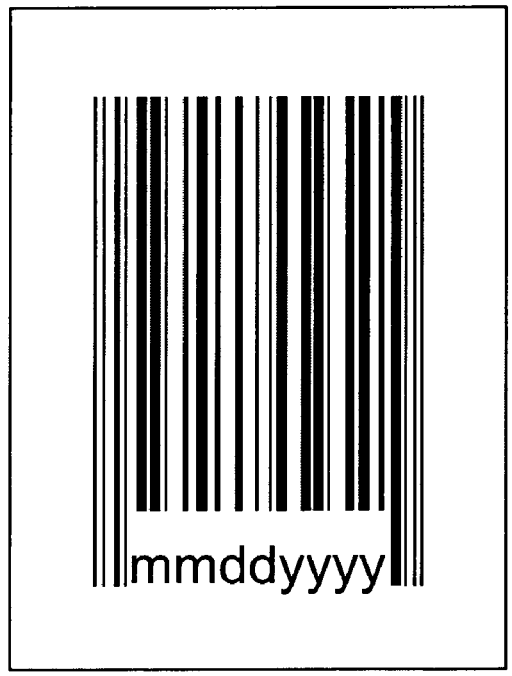
*FIG. 10*

METHOD AND APPARATUS TO ENABLE CONSUMER REPLENISHMENT SHOPPING BY USEFUL LIFE

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

This invention deals with the on-line shopping environment and replenishment list generation. In particular, the invention relates to a method to enable consumer replenishment shopping by expiration date.

2. Description of the Related Art

The Internet is increasingly being exploited as a means to reach consumers directly.

For example, purchasing consumable items from an electronic grocery or retail outlet is a business beginning to take form on the Internet. However, current practice has identified several contributing factors acting as barriers to wide acceptance of this new marketing channel. First, shopping in a grocery store will occur one or more times a week. Second, the typical inventory is on the order of tens of thousands of products, many of which are sold in several different sizes. Third, consumers selecting to use such a service are doing so in the hope of saving time.

However, shopping for a hundred or so items out of an inventory of thousands of items in an electronic shopping service is thus far a very tedious task for consumers. This task becomes worse when the service is utilized several times a month. Such a service can relate to many different situations too numerous to mention. A good example at the retail level is replenishing consumable and perishable items such as groceries from a supermarket.

There is a need to simplify many aspects of electronic shopping. A shopper visiting an e-commerce site may use an application to create, organize and submit orders to that site. Electronic shopping lists or e-lists are created by the user and stored for later retrieval by the shopper for modification and/or reuse. The electronic shopping lists may include selections reflecting various replenishment scenarios: daily, weekly, monthly, holidays and equivalent. When the e-lists contain items having a limited shelf life, or perishable items such as those offered by a grocer, a shopper may choose to create a replenishment scenario based on items that have exceeded their "use" by date. However, this method may prove to be time consuming. Therefore, there is a pressing need to find a method or tool, which enables consumers to save significant amounts of time by utilizing electronic shopping and replenishing their e-lists.

Another problem that may occur is that consumers may have a need to replenish items other than those having reached an "expiration date." For example, many consumable items have a variable limited "useful life", such as motor oil, and ballpoint pens. Variability is introduced by the consumer's personal habit. Based on this problem, there is a pressing need to solve replenishment for consumers by "useful life." Current technology generally uses the results of the data mining process to notify users of these types of situations via e-mail or telemarketing (or a combination). However, it would be helpful for consumers to have a more convenient way of replenishing their shopping list.

SUMMARY OF THE INVENTION

According to one aspect of the invention, a method for producing a shopping list of consumable items based on the useful life of a consumable item, the method on an e-commerce site comprising the steps of: storing data representing an inventory of items for sale at the e-commerce site; storing one or more shopping lists, each for a plurality of consumers at the e-commerce site; storing the purchase history of the items purchased by one or more consumers at the e-commerce site; storing a predetermined useful life of at least one item purchased in the purchase history by scanning a product code during the previous delivery of at least one item to at least one of the plurality of consumers, and predicting the useful life based on the rate of consumption by the at least one of the plurality of consumers; receiving a request from the at least one consumer for at least one of the shopping lists to build an active shopping list; reviewing the purchase history for the at least one consumer to determine if at least one consumable item previously purchased from the purchase history has exceeded the predetermined useful life; prompting the at least one consumer to authorize the addition of the at least one consumable item previously purchased; and adding the at least one consumable item to the active shopping list if authorized by the at least one consumer.

In an alternate embodiment, a computer readable medium and system is disclosed that corresponds to the method above.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 2 is a block diagram of the major electrical components of an information processing system according to the present invention.

FIG. 3 is a block diagram illustrating the software hierarchy for the information processing device of FIG. 2 according to the present invention.

FIG. 10 is an illustration of an alternate embodiment of the exemplary bar code of FIG. 9, according to the present invention.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Client-Server Platform

Figure 1:
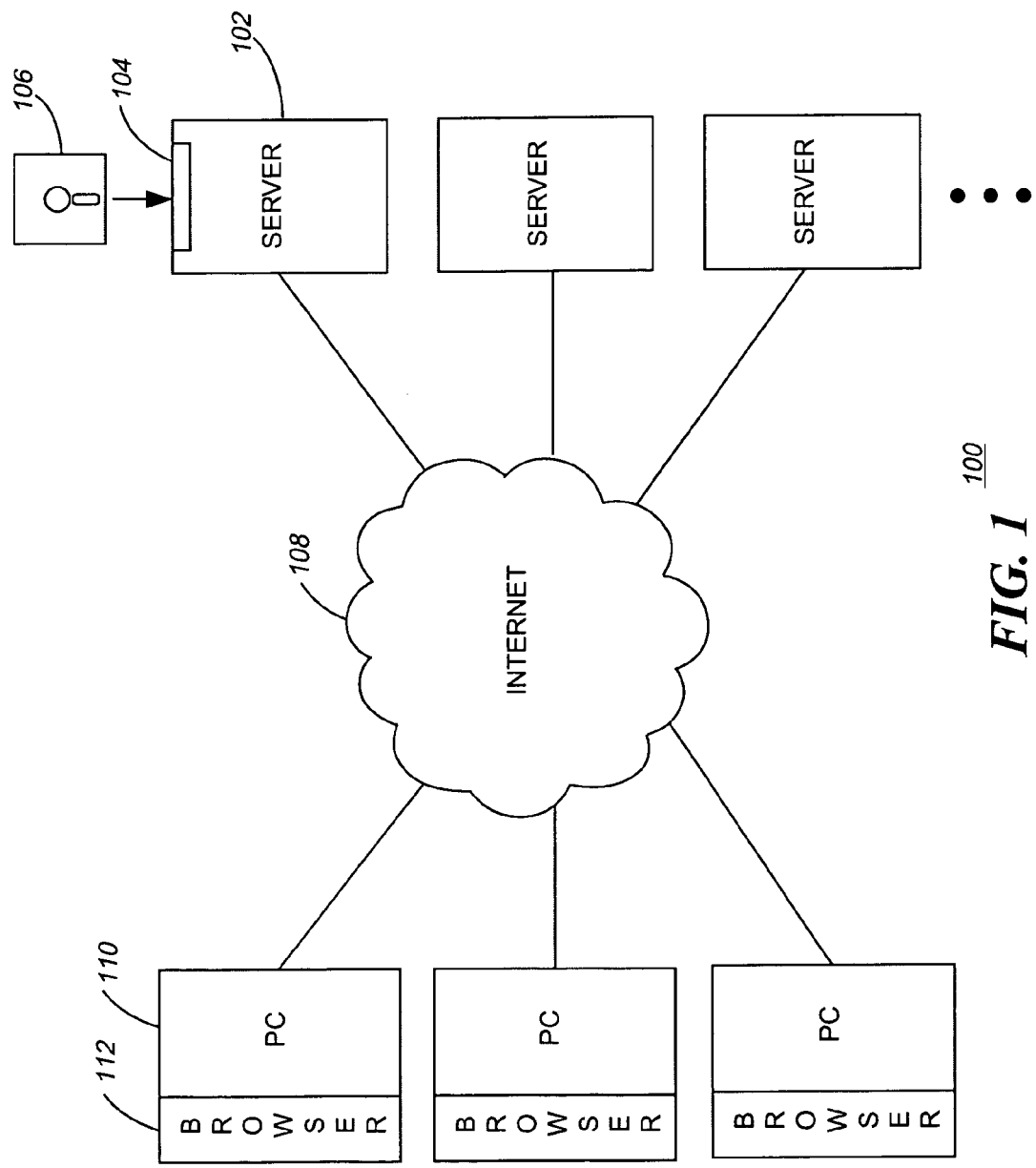
FIG. 1 is a block diagram of a client-server system for carrying out this present invention.

FIG. 1 is an exemplary block diagram of a client-server system 100 for carrying out this present invention. An e-commerce server information processing system 102 such as an IBM PC Neffinity Server™, IBM RS/6000™, IBM PowerParallel™, IBM System 390™ or equivalent. The server 102 has an interface 104 for reading programming information from a computer readable medium 106 such as a floppy diskette, CD ROM, DVD ROM, Flash Memory or other removable computer readable medium. The server 102 is linked to a plurality of client information processing systems 110, such as a PC via a network 108, such as the Internet, running a browser 112 such as Hot Java, Microsoft's Internet Explorer or Netscape's Navigator. It should be understood that any Internet capable wired or wireless device such as a PDA, a smart phone, a Web TV™, or a thin client, can be used as information processing system 110.

Referring to FIG. 2, there is shown a block diagram of the major electrical components of an information processing system 200 in accordance with this invention.

The electrical components include: a central processing unit (CPU) 208, an Input/Output (I/O) Controller 210, a system power and clock source 212; display driver 214; RAM 202; ROM 204; ASIC (application specific integrated circuit) 206 and a hard disk drive 218. These are representative components of a computer. The operation of a computer comprising these elements is well understood. Network interface 216 provides connection to a computer network such as Ethernet, Token Ring using TCP/IP or other popular network protocol interfaces. Optional components for interfacing to external peripherals include: a Small Computer Systems Interface (SCSI) port 224 for attaching peripherals; a PCMCIA slot 222; serial port 220, parallel port 230 and USB (Universal Serial Bus) 232. An optional diskette drive 226 is shown for loading or saving code to removable diskettes 228 or equivalent computer readable media. It is important to note that the system 200 a can be implemented as any or all of the two information processing components of FIG. 1, the client 110, the server 102.

The system 200 may be implemented by combination of hardware and software. Moreover, the functionality required for using the invention may be embodied in computer-readable media (such as 3.5 inch diskette 228 or 106) to be used in programming an information-processing apparatus (e.g., a personal computer) to perform in accordance with the invention. Computer program means or computer program in the present context mean any expression, in any language, code or notation, or set of instructions intended to cause a system having an information processing capability to perform a particular function either directly or after either or both of the following: a) conversions to another language, code or notation; b) reproduction in a different material form.

FIG. 3 is a block diagram illustrating the software hierarchy for the information processing system of FIG. 2 according to the present invention. The hardware 200 is the information processing system of FIG. 2. BIOS (Basic Input Output System) 302 is a set of low level of computer hardware instructions, usually stored in ROM 206, for communications between an operating system 306, device driver(s) 304 and hardware 200. Device drivers 304 are hardware specific code used to communicate between and operating system 306 and hardware peripherals such as a mouse, CD ROM drive or printer. Applications 308 are software application written in C/C++, Java, assembler or equivalent. Operating system 306 is the master program that loads after BIOS 302 initializes, that controls and runs the hardware 200. Examples of operating systems include DOS, Windows 3.1/95/98/NT, Linux, Unix, Macintosh™, AIX™, OS/2™ and equivalent. In one embodiment, the application 308 resides on the Server 102 and communicates with client 110 over the network 108. In yet another embodiment, the application 308 is a hybrid application 308 that exists both on the Server 102 and on the client 110.

The present invention can be realized in hardware, software, or a combination of hardware and software. The application 308 according to the present invention can be realized in a centralized fashion in one computer, or in a distributed fashion where different elements are spread across interconnected computer systems. Any kind of computer system, or other apparatus adapted for carrying out the method described herein, is suited. A typical combination of hardware and software could be a general purpose computer system such that it carries out the methods described herein. The present invention can also be embedded in a computer program product, which comprises all the features enabling the implementation of the methods described herein, and which—when loaded in a computer system—is able to carry out these methods.

Exemplary E-Commerce Server Functional Software Components

The term "database" is used throughout this present invention. Database as used in this present invention, means any collection of data with a given structure for accepting, storing, and providing information on demand. The database can be a relational database, a sequential database, a hierarchical database, an object database, a simple delimited file and more.

Figure 4:
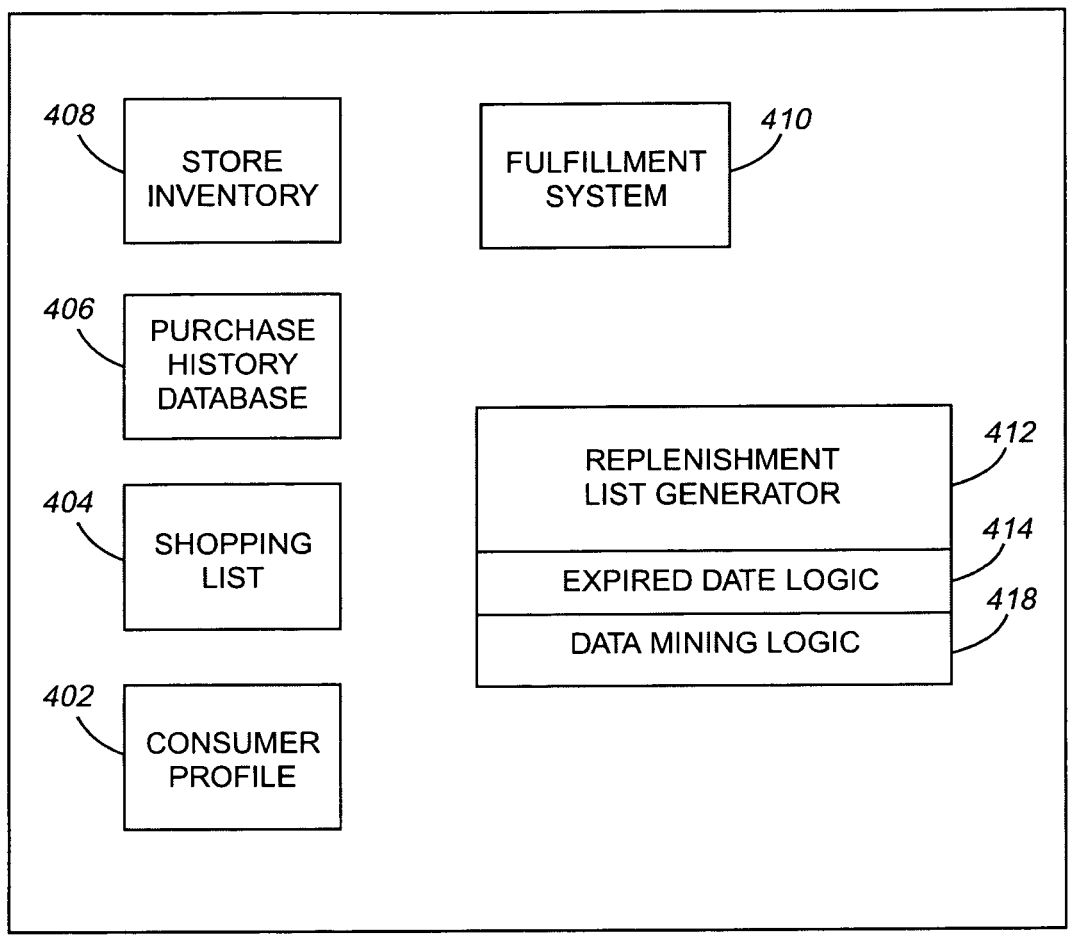
FIG. 4 is a block diagram of the functional software components in one or more applications on the e-commerce server of FIG. 1, according to the present invention.

Turning to FIG. 4 shown is a block diagram of the functional software components in one or more applications 308 on Server 102. The following databases are shown as logically distinct but those skilled in the art understand that one or more of these databases or application components can be combined.

- Consumer profile 402 stores consumer preferences such as brand names, model, types, size and other information related to the purchase of goods including, but not limited to, historical purchase data, personal information, charge authorization data and the like.
- Shopping list 404 stores the user's current shopping list.
- Purchase history database 406 holds the history of the user's previous purchases.
- Store inventory 408 stores the inventory currently available at the store or stores to which the shopping list 404 is to be applied.
- Fulfilment System 410 stores the expiration date for any item shipped in the purchase history database 406. This usually is connected to a fulfillment center (not shown) which arranges for the physical pickup or delivery of an item or items ordered from the shopping list 404
- Replenishment list generator 412 uses the results from either the expired date logic 414 and/or the data mining logic 418 to generate a replenishment list 506. A description of replenishment generation is described in the non-provisional patent application Ser. No. 09/048,520 filed Mar. 26, 1998, now [Pending], entitled "Electronic Commerce With Shopping List Builder" with inventors David J. Allard et al. which is commonly assigned herewith to International Business Machines (IBM) Corp. and incorporated hereinto in its entirety by reference.
- Expired date logic 414 is the application that determines which items have expired or will soon expire as previously purchased by a user.
- Data mining logic 418 is the application that determines which items have or will need to be replenished by data mining techniques such as life expectancy, rate of usage and equivalent predictors. The term data mining refers to the process of analyzing data for relationships that have not previously been discovered or rendered explicit. Data mining may include the classification, or the recognition of patterns and a resulting new organization of data (for example, profiles of customers who make purchases). For example, the sales records for a particular brand of tire, if sufficiently analyzed and related to other market data, such as geographic data, reveal a tread life pattern for a specific correlation with the purchase by the same parties of golf equipment.

The e-commerce server 102 provides a virtual retail store that permits shoppers using a browser 112 to purchase goods to be delivered to a consumer. The goods in the virtual retail store are browsed and selected in a way similar to a shopper searching through a brick and mortar store. The e-commerce server can present the total inventory of products which can be purchased. The virtual store is presented in a multimedia format or in simple text. The nature of the graphical images in one embodiment, represent shelves in the store with images of the products placed thereon. The shopping list, in this case, can be represented initially by an image of a shopping cart into which items are placed. One of each item will suffice although different sizes of the same item can also be a displayed. In a graphical environment, the consumer uses a pointing device such as a mouse to copy and drag icons of items from the shelves to the shopping cart. One such system graphical user interface is described in U.S. Pat. No. 5,848,399 by inventor Raymond R. Burke issued on Dec. 8, 1998 entitled "Computer System For Allowing A Consumer To Purchase Packaged Goods At Home" whose teachings are incorporated herein in their entirety as one embodiment for displaying and creating a virtual shopping store.

A shopper's previous shopping lists are available for reference, and can be used as a starting point. This advantageously enables a shopper to start with a shopping list which, in many instances, will be very nearly complete, in the context of a weekly grocery list. The same can be said of a building contractor, who will need to purchase the same kinds of lumber, wallboard, fixtures, fasteners and other building materials for each house under construction.

When items are finally taken to the checkout, figuratively speaking, and purchased, a record of the items purchased is added to the customer's purchase history database 406 with a visit time stamp. Purchased items can be tracked by their SKU (stock keeping unit), UPC (universal product code), retailer code, or a similar identifier. After purchase, arrangements can be made for delivery of the items, either to a specific site or address, or to a pickup facility in a warehouse. As with the historical shopping lists, delivery data can be stored and accessed to speed delivery arrangements as well.

One example of a shopping list builder 412 is described in U.S. patent application Ser. No. 09/048,520 filed Mar. 26, 1998, now [Pending], with inventors David J. Allard, Keith N. Fortenberry, Brad J. Konopik, Robert M. Szabo, James J. Toohey, entitled "Electronic Commerce with Shopping List Builder" whose teachings are incorporated herein in their entirety as one embodiment for displaying and creating one aspect of a virtual shopping experience. The shopping list builder 412 provides a shopper with a single tool for constructing entirely new shopping lists, that are created from scratch, and for constructing new shopping lists from the stored purchase history database 406.

The consumer has both graphical and textual means to locate items for purchase. The graphical interface provides a familiar visual navigation aid or metaphor for search and selection. In an embodiment for a grocery store, such an aid can be a grocery store cart which can be moved up and down aisles of foods and other products sold in such stores. Consumer defined help levels are available to guide the consumer. The basic selection object is referred to herein as a pick list. The consumer tags items on the list for inclusion into his/her virtual shopping cart.

Pick lists can be sorted by type, date, category, subcategory and description as well as other criteria that may be particularly suited for the kinds of goods or services offered by the e-commerce site. In this manner, a pick list can be tailored to the specific needs and style of the individual consumer. A pick list can also be tailored to the specific needs and style of the picking facility.

The searching method combines multiple search strategies based on the context. For example, clicking on the sub-category of a particular item will issue a sub-category search seeded with the sub-category name clicked on by the consumer. The facility to issue an arbitrary search type and also argument is provided. Searching can be based on, but is not limited to item category, item sub-category, item brand, item manufacturer, and item description. In all cases, the results are returned as a pick list.

Selection is based on the pick list returned by a search. Consumers copy items they wish to purchase from a pick list to their shopping cart. Lists can be easily modified at any time. For example, items may be deleted, added, and modified directly off a pick list.

Exemplary GUI for E-Commerce Purchase

Figure 5:
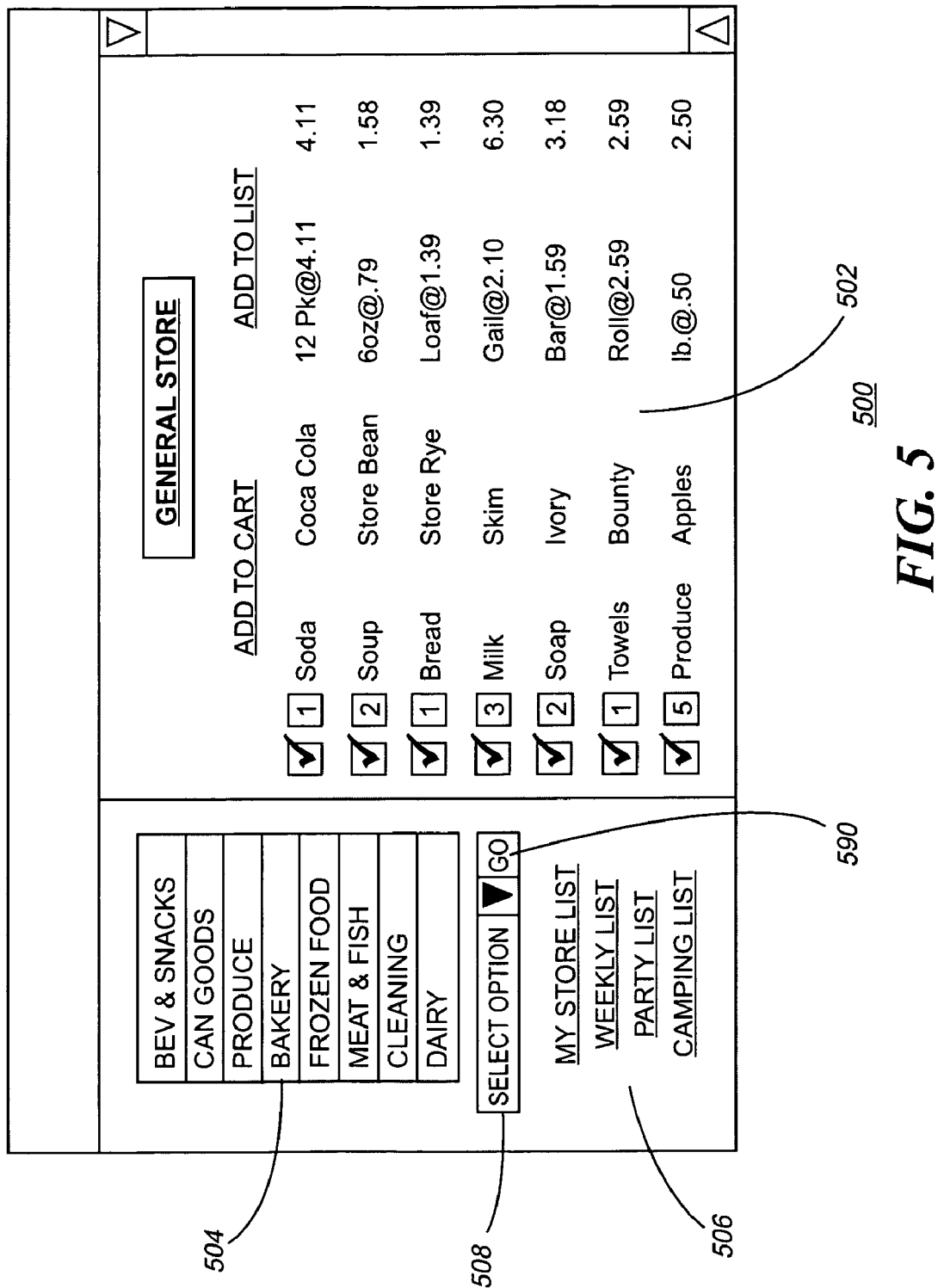
FIG. 5 is an exemplary GUI (graphical user interface) presented by e-commerce server to a user on a client system, according to the present invention.

FIG. 5 is an exemplary GUI 500 (graphical user interface) presented by an e-commerce server to a user on a client system, according to the present invention. The example shown here is for groceries, but it should be appreciated that any inventory of items can be similarly represented. In accordance with general practice, user activatable functions are presented in pull down menus, in icons of buttons or pictures and in underlined words or phrases. Functionality of icons and underlined words or phrases is usually indicated to a user by the pointer arrow cursor changing to a hand and pointing finger when moved to the immediate vicinity of the icons or underlined words or phrases. The GUI 500 has a section 502 containing product data, a section 504 containing categories of items in the inventory by which items can be searched and from which items can be selected, and a list of historical shopping lists 506 for each shopper. The shopping list 506, as shown in FIG. 5, can be a named list such as a weekly shopping list, a monthly shopping list, a list for a party or any other previously created list by a shopper. A drop down menu 508 enables shoppers to select a number of shopping functions. A Go button 510 initiates a procedure, for example, proceeding to the checkout phase of the virtual shopping trip when the product selections are complete.

Exemplary Process Flow for Purchasing a Perishable Item

The purchasing process 600 begins with the customer logging onto an e-commerce site 102 using the client system 110, in step 602. A replenishment list 506 is selected and items for purchase are selected, in step 604. The order is fulfilled and recorded in the purchase history database 406 in step 606. A test is made to determine if the item purchased is perishable, step 608. If a perishable item is purchased, the date of the perishable item is set in the purchase history database 406 in step 610. The expiration dates for perishable items are captured on a per item basis as exemplified below in FIGS. 9 and 10. The item is then ready for delivery 612.

Exemplary Process Flow for Replenishing Perishable Items

Figure 6:
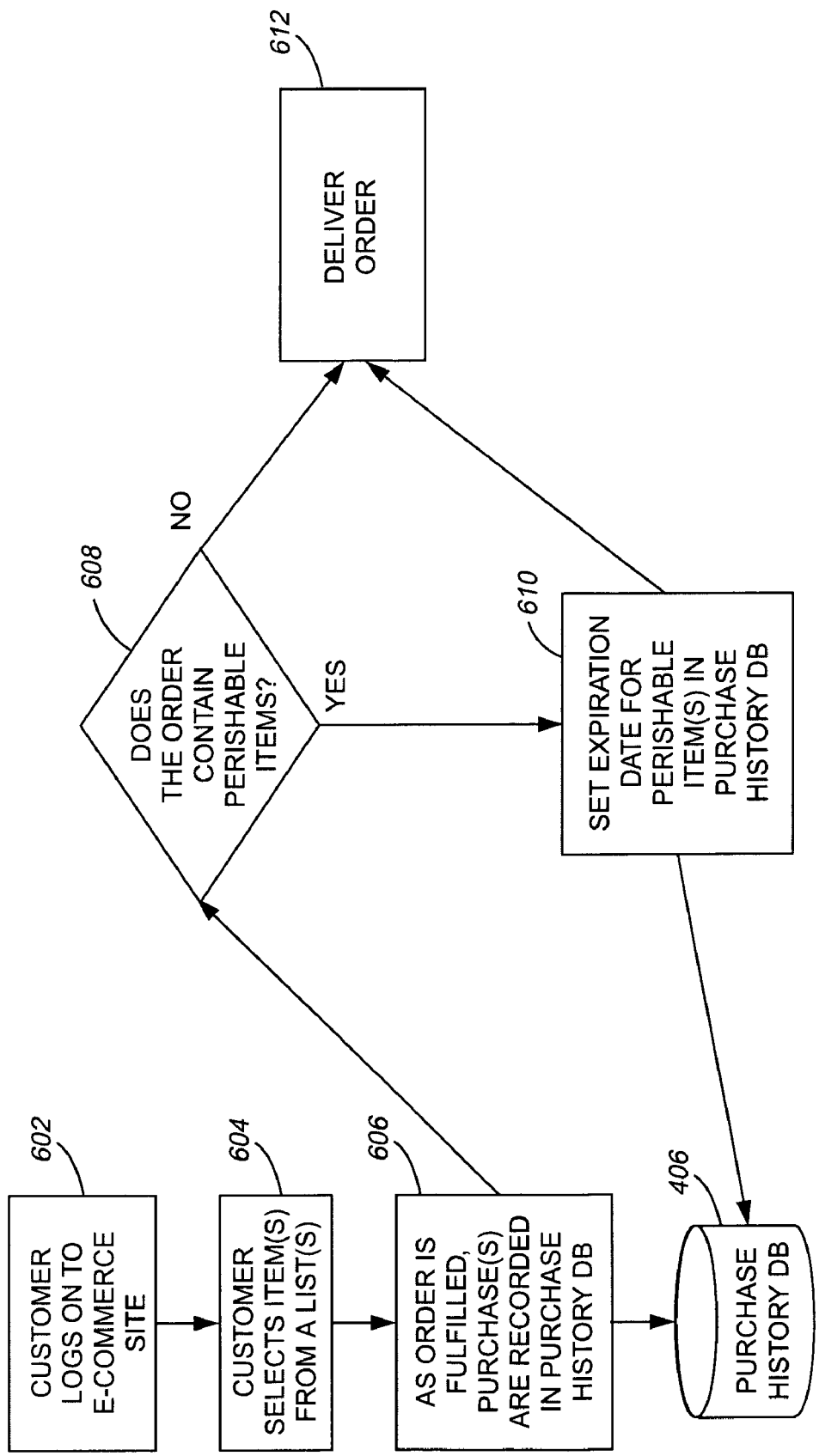
FIG. 6 is a process flow on the e-commerce server for a client purchasing a perishable item from the e-commerce server according to the present invention.

The replenishment process 700 begins with the same steps of FIG. 6 with the customer logging onto an e-commerce site 102 using the client system 110, in step 702. A shopping list or replenishment list 506 is selected and items for purchase are selected in step 704. The customer's previous purchases are saved in the purchase history database 406. The replenishment list generator 412 with expired date recognition logic 414 then begins the process of creating a replenishment list 506, step 706. The replenishment list process includes the querying of records stored in the customer's purchase history database 406 and the shopping list database 404. The records of perishable items retrieved are merged with replenishment list 506, so that no duplicate records are created. One method that can be advantageously used with the present invention to create a merged list is the process of boolean "ORing" together the records of perishable items retrieved and the replenishment list 506, to form a superset of the items in the selected replenishment list 506. For example, the consumer may have selected a party shopping list for the replenishment list 506 and the list includes soda. The size, brand and flavor of soda is derived from the purchase history database 406 or from the consumer profile 402.

Next, in step 708, the replenishment list generator 412 dynamically creates a perishable item replenishment list 506 for the shopper by reviewing what was purchased previously from the purchase history database 406. Using eggs as an example of perishable items previously purchased, the replenishment list generator 412 would determine if the eggs previously purchased are approaching or may have exceeded their expiration date. In an alternate embodiment, the replenishment list generator 412 creates a shopping replenishment list 506 at a predefined interval such as daily, weekly, bimonthly and other schedules selected by the customer. The replenishment list generator 412 updates the shopper's shopping list according to his/her preferences, such as a particular brand, quantity or size. The shopper's preferences would have previously been saved in a consumer profile 402. It is important to note that any given e-commerce server 102 can only replenish a consumer's shopping list according to its store's current inventory; this is accomplished by the replenishment list generator 412 querying a store inventory database 408 as it queries the purchase history database 406 for expired products.

In the event that an item is no longer available at the e-commerce site, as determined from the inventory database, substitute items are suggested to the consumer. For example, should the store no longer carry a certain brand of milk that is on the shopper's list, the replenishment list generator 412 still needs to recognize this as an item needing to be updated on the shopper's replenishment list 506 and offer an alternate brand, or an alternate size or another type available in the store inventory 408.

It is important to note that the shopping list selected by a consumer may be a null list. For example, the customer my decide to update all the items that are about to expire without the need to shop for anything on a predefined shopping replenishment list 506. Returning to the eggs example, the customer may not select a replenishment list 506 or the selected replenishment list may be an empty or null list not having any entries. During, the process of merging with no duplicative entries, the perishable items that are expiring would add the eggs from the purchase history database 406 if the expiration date for the eggs is within a predetermined range. The predetermined range may be set by the user, the grocer, the manufacturer, or in other ways and is definable in the user profile 402. The range may be a day, a week or some other period before or after the expiration date.

Continuing with process flow 700, next the customer selects items from the replenishment list 506. As an example, even though the replenishment list generator 412 reports that a dairy product, such as milk, has expired, the customer may choose not to fulfill this item because of an upcoming trip away from home and the customer will not be needing the item during this shopping session. Once the customer reviews the items to be purchased by the replenishment list 506, an order is sent to the fulfillment system 410, and the customer's information is updated in the purchase history database 406, step 712. Finally, a check is made to see if the order being fulfilled contains a perishable item, step 714. An order not containing a perishable item is set for pickup or delivery, in step 718. Alternately, if the order contains one or more perishable items, the perishable items respective expiration dates are set in the purchase history database 406, step 716 before being set for pickup or delivery, in step 718.

Exemplary Process Flow for Capturing Product Expiration Date

Figure 8:
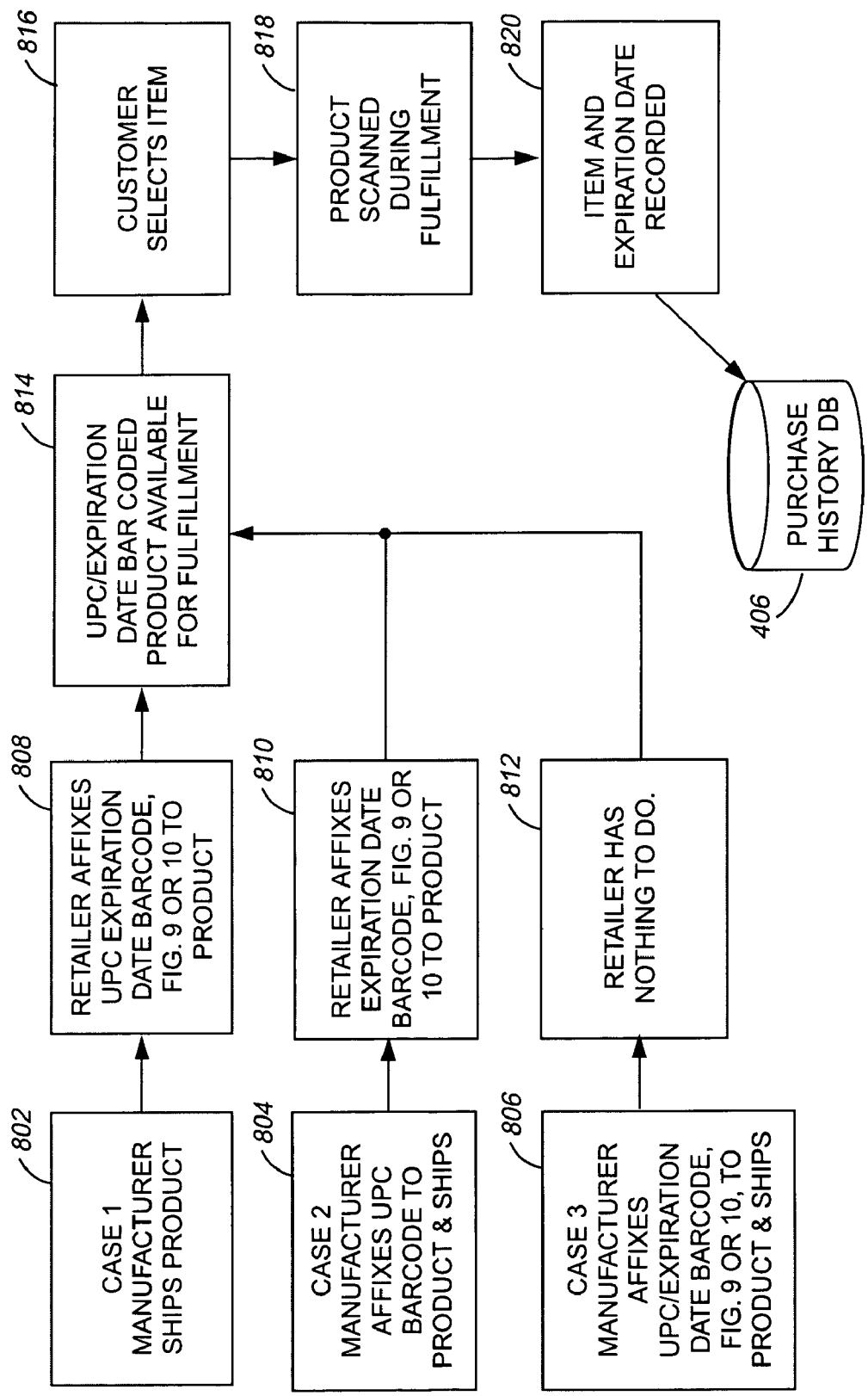
FIG. 8 is an exemplary process flow for capturing product date expiration for the expired date logic of FIG. 4, according to the present invention.
Figure 9:
FIG. 9 is an illustration of an exemplary bar code with date field for use in capturing the product date expiration in the process flow of FIG. 8, according to the present invention.

FIG. 8 is an exemplary process flow 800 for capturing product expiration date for the expired date logic 414 of FIG. 4, according to the present invention. The process begins with one of three cases, 802, 804, 806 which are described separately as follows. Case 802 is where the manufacturer ships a product and a retailer or distributor affixes, in an exemplary way, a bar code with a date as shown in FIG. 9 and alternately in FIG. 10, step 808. Case 804 is where the manufacturer ships a product and in an exemplary way affixes the bar code and date as shown in FIG. 9 and alternately in FIG. 10, step 810. Case 806 is where the manufacturer in an exemplary way affixes a bar code as shown in FIG. 9 or FIG. 10 and ships the product. These three case are exemplary only and other machine readable or human readable symbols are possible for indicating a date for expiration of a product. Moreover, the exact sequence in the distribution chain of where the date is determined and associated with the current product may be changed and is still within the true scope and spirit of the current invention.

When a customer orders an item and the item is delivered through the fulfillment system 410, the product expiration bar code labels in FIG. 9 and FIG. 10 are read and stored along with the product in the purchase history database 406, steps 816, 818 and 820.

Although expiration dates for perishable items may be recorded manually or in other ways at the time of order fulfillment, a preferred embodiment would be for the industry to add bar code expiration dates during manufacture or packaging such that the expiration date could be scanned like a UPC code and associated with the item's purchase history. For example, if a Point of Sale system is used in the replenishment process, it could be modified to scan the additional bar code and make that data available to the List Builder Tool via a Query Interface. The phrase "Expiration Date" is meant to include similar phrases such as "Use By Date" and "Shelf Life."

Exemplary Process Flow for Purchasing a Consumable Item

Figure 11:
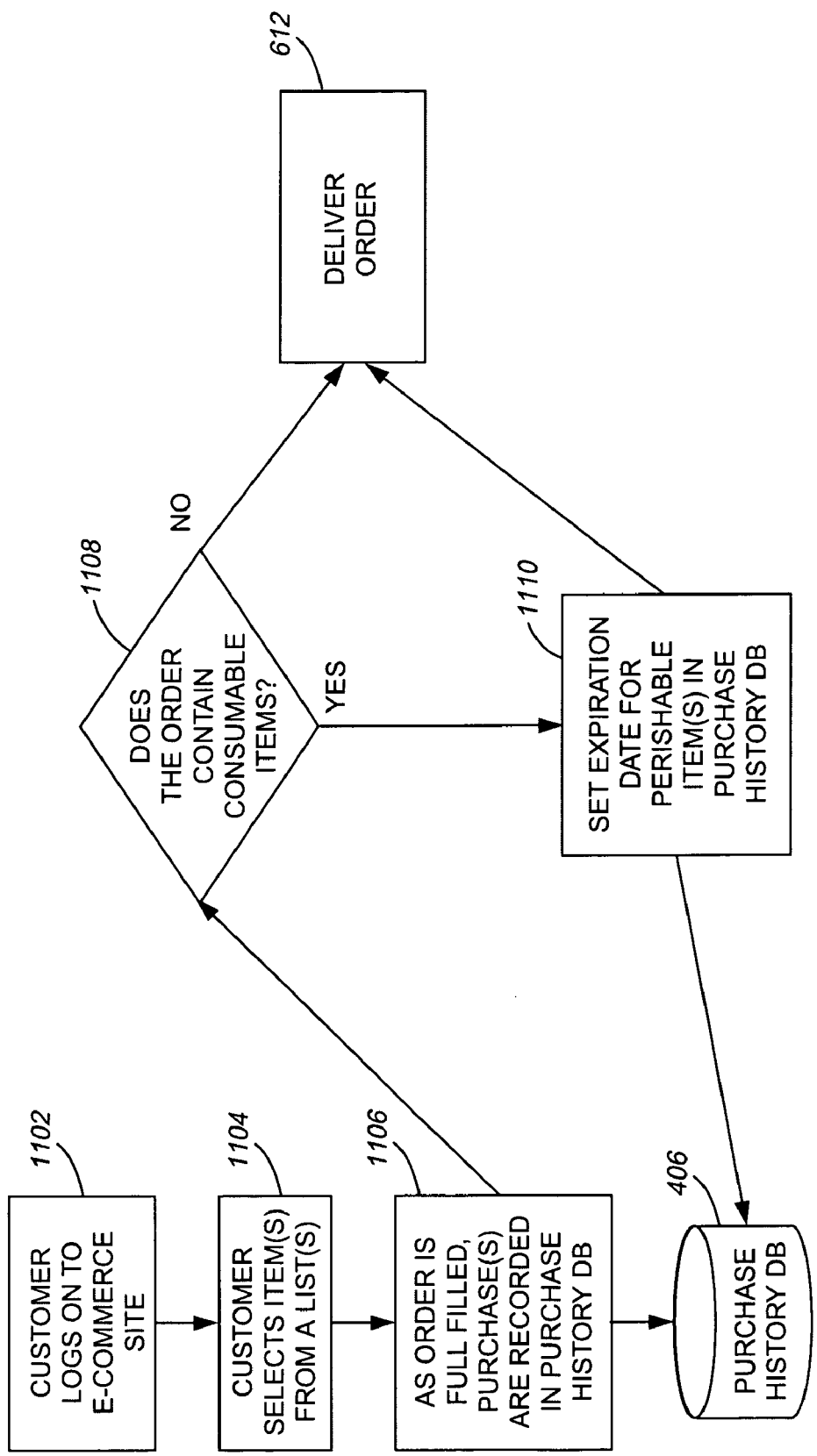
FIG. 11 is a process flow on the e-commerce server for a client purchasing a consumable item with a useful life from the e-commerce server according to the present invention.

FIG. 11 is a process flow on the e-commerce server for a client purchasing a consumable item with a useful life from the e-commerce server according to the present invention. The process 1100 begins with the customer logging onto an e-commerce site using a client system 110, in step 1102. A replenishment list 506 is selected and items for purchase are selected in step 1104. The order is fulfilled and recorded in the purchase history database 406 in step 1106. A test is made to determine if the item purchased is consumable, that is does that product have a limited useful life, step 1108. If a consumable item is purchased, the date of the consumable item is set in the purchase history database 406 in step 1110. The process of calculating the date is described in FIG. 13 below.

Exemplary Process Flow for Replenishing Consumable Items

Figure 12:
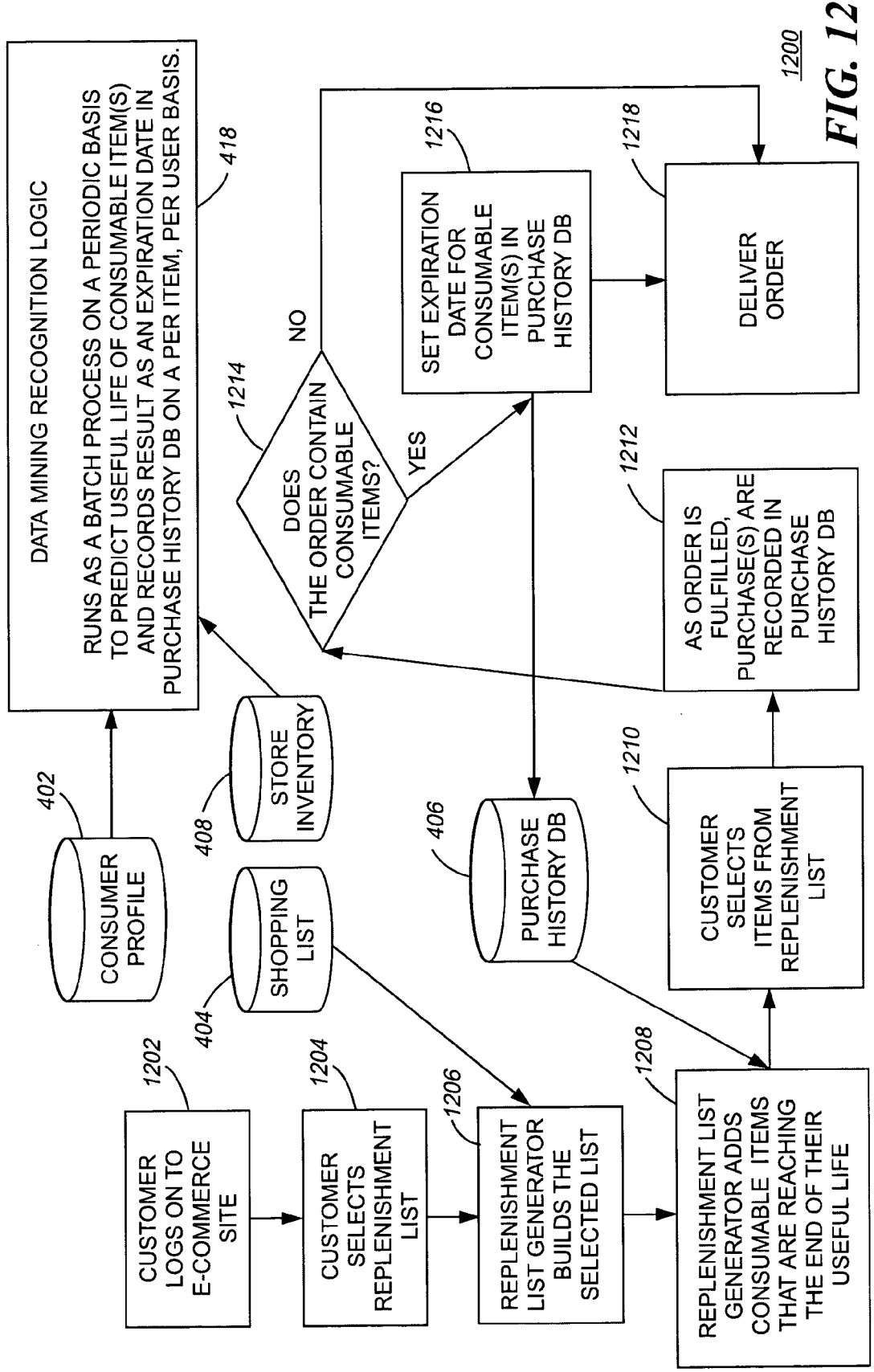
FIG. 12 is a process flow on the e-commerce server for a client replenishing a consumable item previously purchased in FIG. 11, according to the present invention

FIG. 12 is a process flow on the e-commerce server for a client replenishing a consumable item with a useful life from the e-commerce server according to the present invention. The replenishment process 1200 begins with the customer logging onto an e-commerce site 102 using the client system 110, in step 1202. A replenishment list 506 is selected in step 1204 by the customer. This is analogous to the steps 702–706 described above for a perishable item. A replenishment list 506 is selected in step 1204. The customer's previous purchases are saved in the purchase history database 406. Using the shopping list database 404, a shopping replenishment list 506 is generated in step 1206. The replenishment list generator process 1208 includes the querying of records stored in the customer's purchase history database 406 and the shopping list database 404. The records of consumable items retrieved are merged with the replenishment list 506, so that no duplicate records are created. One method that can be advantageously used with the present invention is the process of boolean "ORing" together the records of purchase history database 406 retrieved and the replenishment list 506. For example, the consumer may have selected an office replenishment list 506 that includes paper. The size, brand, and quantity of paper is derived from the purchase history database 406 or from the consumer profile 402.

Figure 7:
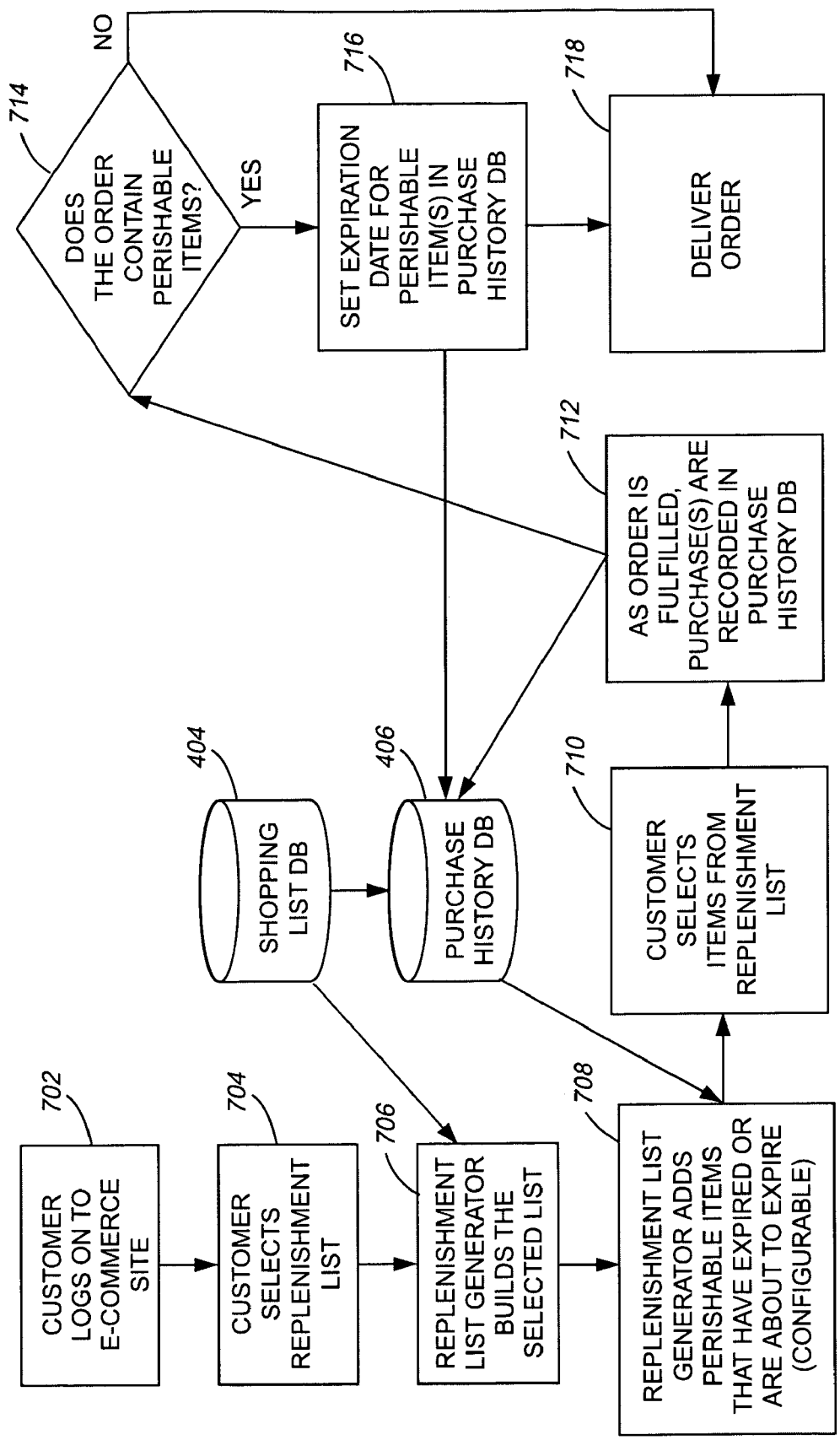
FIG. 7 is a process flow on the e-commerce server for a client replenishing a perishable item previously purchased in FIG. 6, according to the present invention.

Next, in step 1208, the replenishment list generator 412 dynamically creates a replenishment list 506 for the shopper by reviewing what was purchased previously from the purchase history database 406. Returning to the paper example, the replenishment list generator 412 would determine if the toner previously purchased may be running out. The replenishment list generator 412 adds consumable items that have reached or are near reaching the end of their useful life. The data mining recognition logic, 418 is more fully described in the section below entitled "Exemplary Process Flow for Capturing the Product Life Expectancy." The replenishment list generator 412 updates the shopper's shopping list according to his/her preferences, such as a particular brand, quantity or size. The shopper's preferences would have previously been saved in a consumer profile 402. As discussed above for FIG. 7, it is important to note that any given e-commerce server 102 can only replenish a consumer's shopping list according to its store's current inventory; this is accomplished by the replenishment list generator 412 querying a store inventory database 408 as it queries the purchase history database 406.

As stated above, the replenishment list 506 can be a null list. In other words, the process of boolean ORing the consumable items that are expiring would add the toner from the purchase history database 406 if the toner is nearing or has passed a predetermined product life expectancy.

Once the consumable items that are nearing life expectancy have been added to the replenishment list 506, the user is able to make a final determination on whether to replenish an item. For example, the data mining recognition logic may predict that the toner cartridge on a printer is near the end of the useful life. However, the consumer's use of the printer may have changed dramatically since the last purchase and the predicted period for replenishing the cartridge is extended. The items being fulfilled are recorded in the purchase history database 406, in step 1212. A test is made, in step 1214, to determine if the order contains a consumable item. In the case where the order does not contain a consumable item, the order is set for pickup or delivery in step 1218. In the event the order does contain a consumable item, the expiration date is set in the purchase history database 406, in step 1216, before proceeding to step 1218.

Exemplary Process Flow for Capturing the Product Life Expectancy

As illustrated in FIG. 12, the data mining logic 418, uses a combination of the information stored in the consumer profile 402, the store inventory and purchase history database 406 to predict useful life of a consumable item. This data mining logic 418 analyzes a consumer's purchase history and explicit consumer profile and automatically generates a suggested 'End of Useful Life'. For example, a shopper purchases some automobile tires with an expected tread life of 45,000 miles. The data mining logic converts this to an expiration date for that shopper.

Figure 13:
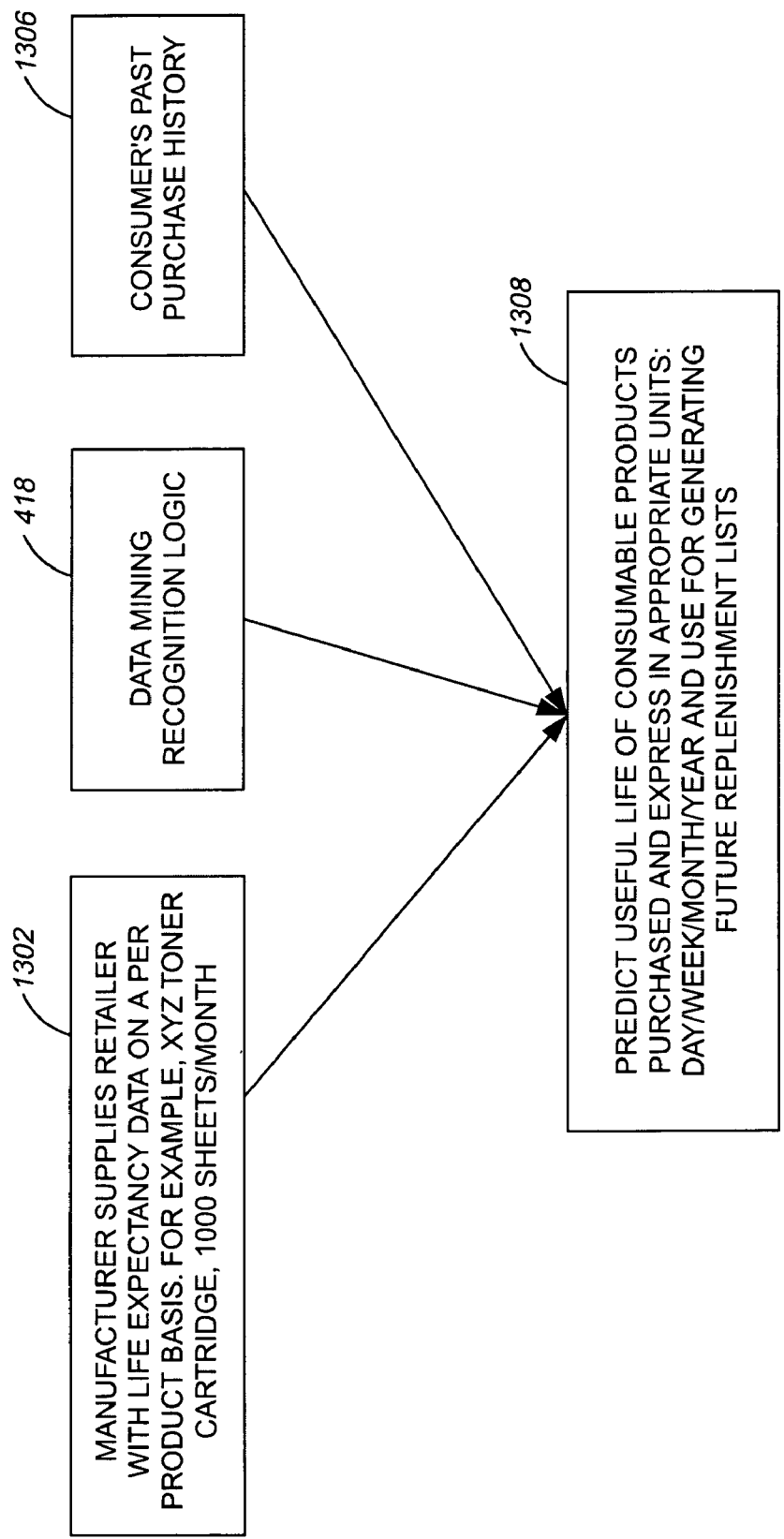
FIG. 13 is an exemplary process flow for capturing the product life expectancy for the data mining logic of FIG. 4 according to the present invention.

FIG. 13 is an exemplary process flow 1300 for capturing the product life expectancy for the data mining logic of 418 according to the present invention. Many consumable items have a variable and limited "useful life" that will be different from consumer to consumer. The exemplary flow 1300 is one embodiment for calculating the expected life of a consumable product independent of the unit in which it is expressed into a future date specifically tailored to the individual consumer. The manufacturer supplies the retailer with the life expectancy date on a per product basis. As an example, a brand ABC toner cartridge and model number 123 has a capacity of 10,000 sheets. Another example may be a brand RST tire model 456 with a tread life of 40,000 miles. Still, another example may be a light bulb from manufacturer XYZ model 789 with a life of 1,000 hours. There are numerous other examples. The manufacturer's supplied information is combined with the consumer past purchased history database 406, to estimate a run rate or consumption rate for a particular consumable item. Returning to the examples, if the consumer purchases toner every three months, a rate of 3,333 sheets a month can be calculated by taking the (manufacturer's expectancy)/(frequency of purchase from purchase history database). The data mining logic 418 is able to remind the consumer to purchase additional toner when the replenishment list 506 is generated.

Likewise if a consumer drives a vehicle 24,000 miles a year and this information has been previously entered into the consumer profile 402. The data mining logic 418 will remind the consumer at 40,000 miles/(24,000 mile per year/12 month per year) or 20 months to purchase new tires.

To those skilled in the art, numerous other examples of analyzing consumers' past shopping patterns are contemplated under this invention. The data mining logic 418, uses a combination of the information stored in the consumer profile 402, the stored inventory 408 and purchase history database 406 to predict useful life of a consumable item. If the store no longer carries the item, another similar product can be suggested.

Although the application of the invention to online shopping has been discussed with reference to the figures, the invention should not be construed as limited thereto. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for producing a shopping list consisting of one or more items, wherein at least one item in the shopping list is a consumable item having a useful life, the method comprising:

storing, in a database, one or more consumer shopping lists of respective consumers at an e-commerce site;

storing, in a database, a list of items previously purchased by one or more of the respective consumers from the e-commerce site;

receiving a request from a consumer for at least one of the consumer shopping lists; and determining if the request from the consumer is from a consumer that has previously purchased one or more consumable items having a useful life from the e-commerce site, and in response to a determination that the user has previously purchased one or more consumable items from the e-commerce site, then performing the sub-steps of:

reviewing the consumer's list of items previously purchased to determine if any items previously purchased are a consumable item with a useful life having a predetermined date, wherein the predetermined date was previously captured during the delivery of the product from the e-commerce site using a machine readable code with a date embedded therein; and adding to the at least one requested consumer shopping list, one or more consumable items from the list of items previously purchased that have exceeded the predetermined date of useful life.

2. The method of claim 1 wherein the sub-step of adding further include the sub-steps of:

prompting the consumer if they want to authorize the addition of the one or more consumable items to be added to the shopping list; and adding the consumable item to the shopping list authorized by the consumer.

3. The method of claim 1 wherein the step of storing one or more consumer shopping lists includes storing a consumer shopping list that has zero items in the consumer shopping list.

4. The method of claim 1, further comprising the steps of:

storing data representing inventory of items available at the e-commerce site; and wherein the step of storing one or more consumer shopping lists includes storing a shopping list containing one or more items available at the e-commerce site.

5. The method of claim 1 further comprising the step of:

creating a purchase order for the items in the at least one consumer shopping list.

6. The method of claim 1 wherein the step of storing a list of items previously purchased includes:

storing the predetermined date of useful life for at least one item.

7. The method of claim 6 wherein the step of storing the predetermined date of useful life for at least one item includes the sub-step of:

calculating from the predetermined date a replacement date to associate with the identifier code by data mining previous purchases of at least one of the items purchased.

8. The method of claim 7, wherein the sub-step of calculating includes calculating if at least one consumable item has a useful life based on a quantity associated with the item and calculating the predetermined date of useful life based upon a consumer's rate of consumption of the quantity associated with the item.

9. The method of claim 7, wherein the sub-step of calculating includes calculating if at least one consumable item has a replacement date based on a wear-life associated with the item and calculating the replacement date based upon a consumer's rate of consumption of the wear-life associated with the item.

10. A method for producing a shopping list of consumable items based on the useful life of a consumable item, the method on an e-commerce site comprising the steps of:

storing, on an e-commerce database, data representing an inventory of non-perishable items for sale at an e-commerce site;

storing, on the e-commerce database, one or more shopping lists each for a plurality of consumers;

storing, on the e-commerce database, a purchase history of non-perishable items purchased by the plurality of consumers from the e-commerce site;

storing, on the e-commerce database, a predetermined useful life of at least one of the non-perishable items purchased in the purchase history by scanning a product code with a machine readable date code embedded therein during the previous delivery of at least one item to at least one of the plurality of consumers, and predicting the useful life based on a pre-determined rate of consumption of the at least one of the plurality of consumers;

receiving a request from the at least one-consumer for at least one of the shopping lists to build an active shopping list;

determining if the request from the at least one consumer is from a consumer that has previously purchased one or more non-perishable items having a useful life from the e-commerce site and in response to a determination that the at least one consumer has previously purchased one or more non-perishable items from the e-commerce site, performing the sub-steps of:

reviewing the purchase history for the at least one consumer to determine if at least one non-perishable item previously purchased from the purchase history has exceeded the predetermined useful life;

prompting the at least one consumer to authorize the addition of the at least one non-perishable item previously purchased; and adding the at least one non-perishable item to the active shopping list if authorized by the at least one consumer.

11. The method of claim 10, wherein the step of storing a predetermined useful life includes the sub-step of:

calculating if at least one non-perishable item has a useful life based on a quantity associated with the item and calculating the predetermined useful life based upon a consumer's rate of consumption of the quantity associated with the item.

12. The method of claim 10, wherein the step of storing a predetermined useful life includes the sub-step of:

calculating if at least one non-perishable item has a useful life based on a wear-life associated with the item and calculating the predetermined useful life based upon a consumer's rate of consumption of the wear-life associated with the item.

13. A computer readable medium containing programming instructions for producing a shopping list consisting of one or more items, wherein at least one item in the shopping list is a consumable item having a useful life, the computer readable medium comprising the programming instructions of:

storing on an e-commerce database, one or more consumer shopping lists of respective consumers;

storing a list of items previously purchased by one or more of the respective consumers from an e-commerce site;

receiving a request from a consumer for at least one consumer shopping list from the one or more consumer shopping lists; and determining if the request from the consumer is from a consumer that has previously purchased one or more consumable items having a useful life from the e-commerce site, and if in response to a determination that the user has previously purchased one or more consumable items from the e-commerce site, performing the sub-steps of:

reviewing the consumer's respective list of items previously purchased to determine if any items previously purchased are consumable items with a useful life having a predetermined date, wherein the predetermined date was previously captured during the delivery of the product from the e-commerce site using a machine readable code with a date embedded therein; and adding to the at least one requested consumer shopping list one or more consumable items that have exceeded the predetermined date of useful life.

14. The computer readable medium of claim 13 wherein the programming instructions of adding further include the programming instructions of:

prompting the consumer if they want to authorize the addition of the one or more consumable items to be added to the shopping list; and adding the consumable item to the shopping list authorized by the consumer.

15. The computer readable medium of claim 13, wherein the programming instruction of storing one or more consumer shopping lists includes storing a consumer shopping list that has zero items in the consumer shopping list.

16. The computer readable medium of claim 13, further comprising the programming instructions of:

storing data representing inventory of items available at the e-commerce site; and wherein the step of storing one or more consumer shopping lists includes storing a shopping list containing one or more items available at the e-commerce site.

17. The computer readable medium of claim 13 further comprising the programming instructions of:

creating a purchase order for the items in the at least one consumer shopping list.

18. The computer readable medium of claim 13 wherein the programming instruction of storing a list of items previously purchased includes:

storing the predetermined date of useful life for at least one item.

19. The computer readable medium of claim 18 wherein the programming instruction of storing includes the program instructions of:

calculating from the predetermined date a replacement date to associate with the identifier code by data mining previous purchases of at least one of the items purchased.

20. The computer readable medium of claim 19, wherein the programming instruction of calculating includes calculating if at least one consumable item has a replacement date based on a quantity associated with the item and calculating the replacement date based upon a consumer's rate of consumption of the quantity associated with the item.

21. A computer readable medium containing programming instructions for producing a shopping list of consumable items based on the useful life of a non-perishable consumable item, the computer readable medium comprising the programming instructions of:

storing data representing an inventory of non-perishable consumable items for sale at an e-commerce site;

storing one or more shopping lists, each for a plurality of consumers at the e-commerce site;

storing the purchase history of the non-perishable consumable items purchased by the plurality of consumers at the e-commerce site;

storing a predetermined useful life of at least one of the non-perishable consumable items purchased in the purchase history by scanning a product code with a machine readable date code embedded therein during the previous delivery of at least one non-perishable consumable item to at least one of the plurality of consumers, and predicting the useful life based on a predetermined rate of consumption of the at least one consumer;

receiving a request from the at least one consumer for at least one of the shopping lists to build an active shopping list;

determining if the request from the consumer is from a consumer that has previously purchased one or more consumable items having a useful life from the e-commerce site and in response to a determination that the user has previously purchased, one or more consumable items from the e-commerce site, performing:

reviewing the purchase history for the at least one consumer to determine if at least one non-perishable consumable item previously purchased from the purchase history has exceeded the predetermined useful life;

prompting the at least one consumer to authorize the addition of the at least one non-perishable consumable item previously purchased; and adding the at least one non-perishable consumable item to the active shopping list if authorized by the at least one consumer.

22. The computer readable medium of claim 21, wherein the programming instruction of storing a predetermined useful life includes the programming instruction of:

calculating if at least one non-perishable consumable item has a useful life based on a quantity associated with the non-perishable consumable item and calculating the predetermined useful life based upon a consumer's rate of consumption of the quantity associated with the non-perishable consumable item.

23. The computer readable medium of claim 21, wherein the programming instruction of storing a predetermined useful life includes the programming instruction of:

calculating if at least one non-perishable consumable Item has a useful life based on a wear-life associated with the non-perishable consumable item and calculating the predetermined useful life based upon a consumers rate of consumption of the wear-life associated with the non-perishable consumable item.

24. An e-commerce system for producing a shopping list of consumable items based on the useful life of a non-perishable consumable item, the system comprising:

an inventory database for storing data representing an inventory of non-perishable consumable items for sale at an e-commerce site;

a shopping list database for storing one or more shopping lists, each for a plurality of consumers at the e-commerce site;

a purchase history database for storing the purchase history of the non-perishable consumable items purchased by the plurality of consumers at the e-commerce site;

a useful life database for storing a predetermined useful life of at least one item purchased in the purchase history by scanning a product code with a machine readable date code embedded therein during the previous delivery of at least one non-perishable consumable item to at least one of the plurality of consumers, and predicting the useful life based on a predetermined rate of consumption by the at least one of the plurality of consumers;

means for receiving a request from the at least one consumer for at least one of the shopping lists to build an active shopping list;

means for determining if the request from the consumer is from a consumer that has previously purchased one or more non-perishable items having a useful life from the e-commerce site, and in response to a determination that the user has previously purchased one or more non-perishable items from the e-commerce site, performing the following:

reviewing the purchase history for the at least one consumer to determine if at least one non-perishable consumable item previously purchased from the purchase history has exceeded the predetermined useful life;

prompting the at least one consumer to authorize the addition of the at least one non-perishable item previously purchased; and adding the at least one non-perishable item to the active shopping list authorized by the at least one consumer.

* * * * *